(12) United States Patent
Hardee (10) Patent No.: US 7,340,163 B2
(45) Date of Patent: Mar. 4, 2008

(54) SIGNALING PROTOCOL AND ARCHITECTURE FOR PROTECTION RINGS

(75) Inventor: Kevin M. Hardee, Plano, TX (US)

(73) Assignee: Alcatel Lucent, Paris (FR)

( * ) Notice: Subject to any disclaimer, the term of this patent is extended or adjusted under 35 U.S.C. 154(b) by 713 days.

(21) Appl. No.: 10/320,225

(22) Filed: Dec. 16, 2002

(65) Prior Publication Data

US 2004/0114922 A1  Jun. 17, 2004

(51) Int. Cl.
H04B 10/00 (2006.01)
(52) U.S. Cl. .................. 398/4; 398/5; 398/10; 398/12
(58) Field of Classification Search ............ 398/30–34, 398/3–5, 10, 12, 17, 19; 370/216, 224, 258
See application file for complete search history.

(56) References Cited

U.S. PATENT DOCUMENTS

| | | | |
|---|---|---|---|
| 6,438,619 B1 * | 8/2002 | Coman | 719/319 |
| 6,654,341 B1 * | 11/2003 | Chi et al. | 370/216 |
| 2002/0167899 A1 * | 11/2002 | Thompson et al. | 370/222 |
| 2003/0076857 A1 * | 4/2003 | Morita et al. | 370/466 |
| 2004/0167978 A1 * | 8/2004 | Kitayama | 709/224 |
| 2004/0190461 A1 * | 9/2004 | Gullicksen et al. | 370/258 |
| 2004/0208118 A1 * | 10/2004 | DeBoer et al. | 370/223 |

FOREIGN PATENT DOCUMENTS

| | | |
|---|---|---|
| EP | 1 239 622 A | 9/2002 |
| WO | WO 99/23773 A1 | 5/1999 |

OTHER PUBLICATIONS

Guo, et al.; Hybrid Mesh-Ring Optical Networks and Their Routing Information Distribution Using Opaque LSA; IETF Network Working Group; 2001; pp. 1-10 <draft-guo-optical-mesh-ring-01.txt>.

Ghani, et al.; Architectural Framework for Automatic Protection Provisioning in Dynamic Optical Rings; IETF Internet Draft; 2001; pp. 1-35 <draft-ghani-optical-rings-00.txt>.

Aboul-Magd, et al.; Automatic Switched Optical Network (ASON) Architecture and Its Related Protocols; Internet Draft; IETF IPO WG; Nov. 2001; pp. 1-23.

Rajagopalan, et al.; IP Over Optical Networks: A Framework; Internet Draft; IETF; Feb. 2002; pp. 1-39.

Internet Engineering Task Force, Internet Draft, Optical Automatic Protection Switching Protocol (O-APS), [Retrieved on Jun. 26, 2002]. Retrieved from Internet: (http:www.potaroo.net/ietfold-ids/draft-guo-optical-aps-01.txt).

* cited by examiner

*Primary Examiner*—Dzung Tran
(74) *Attorney, Agent, or Firm*—Jessica W. Smith; Bobby D. Slaton (57) ABSTRACT

Transparent network elements (10) pass data in a data communication plane (24) over optical links (42) and pass control information in a control communication plane (22) over a out-of-fiber/out-of-band (OF/OB) network (44), such as an IP-based network. Previously developed protection state machines (38), such as those used in traditional SONET/SDH systems can be used along with new protection state machines (38), such as shared ring protection state machines. Client State machines (40) and a signaling controller (30) interface between the protection state machines (38) and the OF/OB network (44) such that the protection state machines (38) are isolated from the technicalities of transmission in the separate network.

22 Claims, 6 Drawing Sheets

| VERSION NUMBER | MESSAGE TYPE | MESSAGE LENGTH | PROTECT TYPE |
|---|---|---|---|
| SOURCE LINK ID | | DESTINATION LINK ID | |
| SEQUENCE NUMBER | | CHECKSUM | |

*FIG. 5*

| ERROR CODE |
|---|

*FIG. 6*

| K1 BYTE | K2 BYTE | RESERVED |
|---|---|---|

*FIG. 7*

| K1 BYTE | K2 BYTE | RPG ID | RING ID |
|---|---|---|---|

*FIG. 8*

0: Init ()
1: Hello
2: Hello_Ack
3: Client_Hello_Sync_Timeout
4: Client_Hello_Dead_Interval_Timeout
5: APS_Change
6: Client_APS_Change()
7: APS_Change_Ack
8: APS_Change_Nak
9: Client_APS_Change_Ack_Timeout

SIGNALING PROTOCOL AND ARCHITECTURE FOR PROTECTION RINGS

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to protection rings.

2. Description of the Related Art

Over the last decade, the importance of telecommunications has increased dramatically. In order to accommodate the vast amount of information passed over telecommunications systems, such as the Public Switched Telephone Network (PSTN) and data networks, copper wires are being replaced with optical fibers, which are capable of carrying significantly more information.

A single fiber may transmit information over many different channels using DWDM (dense wavelength division multiplexing) techniques. Improvements in fiber technology and electronics are increasing the number of channels that may be distinguished over a fiber and, thus, the amount of information that may be passed by a single fiber.

Increases in information bandwidth over a fiber, however, increase the importance of providing mechanisms to bypass failures in the network, until the failure can be corrected. Common failures include, for example, fiber breakages (typically caused by construction activities inadvertently cutting a fiber), fiber disconnects caused by accidents in the central office, and network element failures, such as laser failures.

Figure 1A:
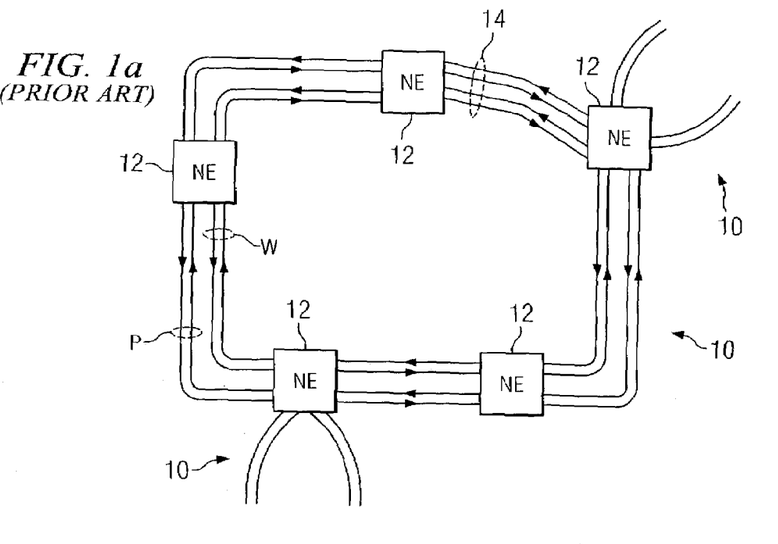
FIG. 1a illustrates a series of network element in a ring architecture.

In order to maintain communications in spite of a failure, ring architectures are often used. In a ring architecture, a series of network elements are connected in a ring, such as shown in FIG. 1a. Each ring 10 has multiple network elements 12 coupled to one another to form a closed loop. Typically, there are four fibers 14 connecting adjacent network elements 10—two working fibers and two protection fibers, although other configurations are possible. The working fibers (W) carry traffic between adjacent nodes. Protection fibers (P) are available to carry traffic in the event of a working fiber failure. The protection fibers also convey control information between network elements; when not being used for traffic, the protection fibers may carry low-priority interruptible traffic.

Figure 1B:
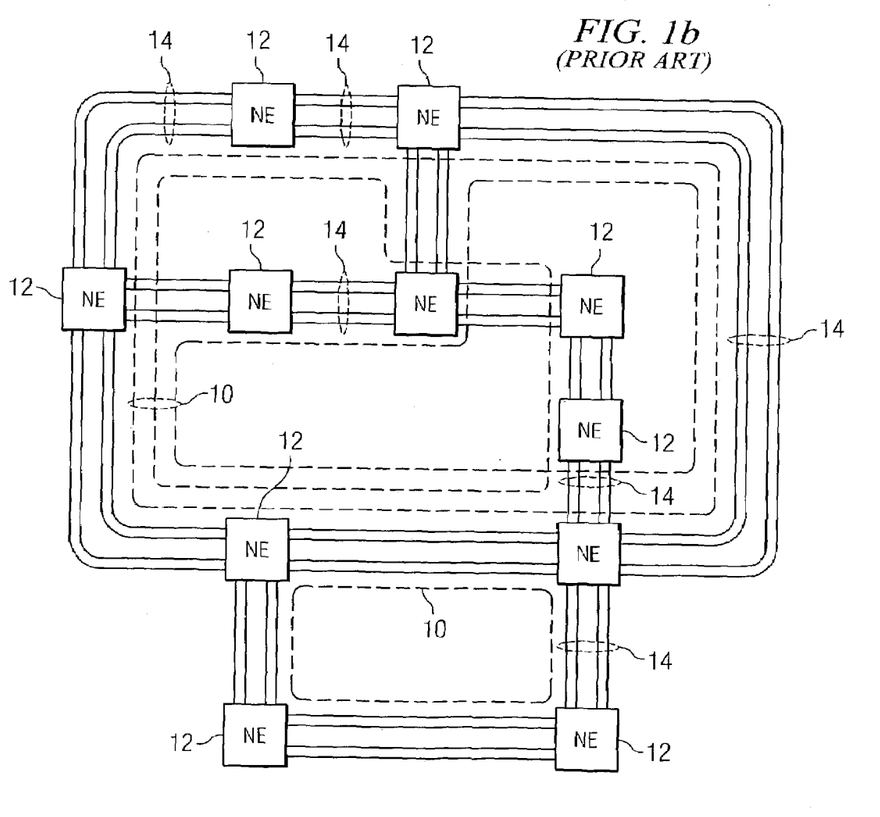
FIG. 1b illustrates a ring architecture with multiple overlapping rings.

The ring architecture shown in FIG. 1a is a very simple architecture. In many circumstances, multiple rings 10 may connect various network elements 12 as shown in FIG. 1b. As shown in FIG. 1a, network elements 12 may be shared between different rings. Failures of a working fiber in any of the rings 10 may cause protect lines in multiple rings to be used.

Figure 2A:
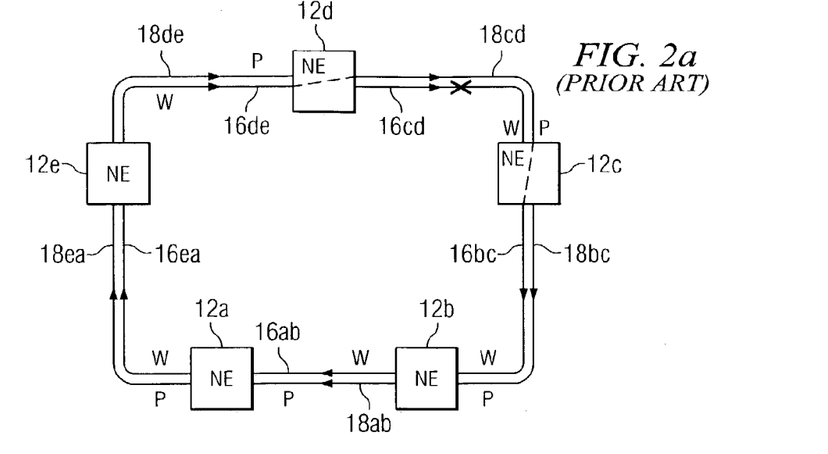
FIG. 2a illustrates a span switch in a ring architecture.

FIG. 2a illustrates one prior art method of circumventing a failure of a working fiber W. In this embodiment, a ring 10 having five network elements 12 (referenced individually as network elements 12a-12e) has a broken working fiber W between network elements 12c and 12d. For purposes of illustration, only one working fiber W and one protection fiber P is shown, it being understood that a similar pair of working and protection fibers are used for traffic in the opposite direction. To pass traffic between network elements 12c and 12d, network element 12d connects the working lines 16de to protect lines 18cd and network element 12c connects working lines 16bc to protect lines 18cd. In other words, traffic that would normally be routed over working lines 16cd is switched to the associated protect lines 18cd. This is referred to as a "span" switch.

Figure 2B:
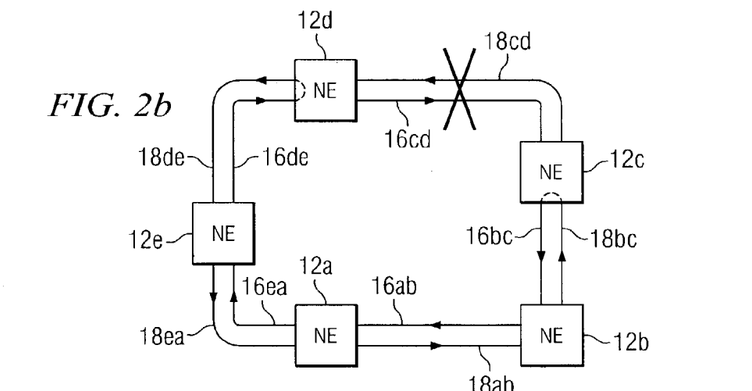
FIG. 2b illustrates a ring switch in a ring architecture.

FIG. 2b illustrates a situation where both the working and protection lines have failed between network elements 12c and 12d. In this case, a "ring" switch is implemented where working line 16de is rerouted to protect line 18de and working line 16bc is rerouted to protect line 18bc. Accordingly, the remaining viable protect lines all carry traffic. Every network element can still communicate with all the other network elements 12 on the ring.

In traditional SONET/SDH applications, the transport mechanism protocol uses K1/K2 overhead bytes transmitted "in-band", i.e., on the same channel as the associated traffic. There is an increasing demand to use "transparent" network elements, which do not translate the data carried on the optical fibers to electronic form; instead the data traffic is switched at the network element using an optical switch. While transparent network elements have the benefit of increased speed through the switch, it is not possible to add control data to the channels. Hence, it is not possible to use the current standard K1/K2 overhead bytes.

In addition, shared protection structures provide additional protection capabilities. A basic shared ring architecture is disclosed in WO 99/23773 (PCT/IB98/01955) to Elahmadi et al, where two rings share a protection path between a pair of common network elements. This application proposes the use of a single physical span (the shared protect line) between the common network elements to provide protection for the two rings. A failure on either ring can be remedied by using the shared protect line to carry traffic. This architecture reduces costs, which can be significant if the distance between the shared network elements is long (or there are other infrastructure costs involved), but increases the chance of a traffic outage on one ring if a failure occurs while there is another failure on another ring.

U.S. Ser. No. 09/903,268, entitled "Method and Apparatus for Signaling in a Shared Protection Ring Architecture", to Mazzurco et al, U.S. Ser. No. 09/858,099, entitled "Common Protection Architecture For Optical Network", to Mazzurco et al, and U.S. Ser. No. 09/858,098, entitled "Optical Shared Protection Ring For Multiple Spans", to Mazzurco et al, all of which are incorporated by reference herein, propose additional features for shared ring structures. These features are not supported by traditional K-byte protection schemes.

Recognizing these problems, the IETF (Internet Engineering Task Force) has generated a proposal for an Optical Automatic Protection Switching protocol (O-APS) for optical rings. This proposal uses the OSC (optical supervision channel) of each link for passing protection signaling. The O-APS protocol in the IETF draft combines the functions of a signaling engine with that of a ring state machine processor. The protocol calls out specific protection switching procedures that are different from traditional, time-tested, switching procedures. The switching procedures are tightly coupled to the passing of the protection signaling data in a single protocol. While the proposed protocol uses information similar to K-bytes for the SONET/SDH standards, the data is encoded in a completely different format.

Making vast changes in the switching procedures and associated data is almost certain to lead to errors, and can add significantly to the cost of developing the equipment.

Therefore, a need has arisen for a protection signaling architecture that takes advantage of previously developed protocols and enables enhanced features for shared ring architectures.

BRIEF SUMMARY OF THE INVENTION

In the present invention, a network element comprises input/output circuitry for transmitting and receiving data traffic over optical links and protection state machines for receiving control information from input/output circuitry indicating transmission failures. Error messages are received from the protection state machines and error information is passed to adjacent network elements over an out-of-band network.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-12 of the drawings, like numerals being used for like elements of the various drawings.

Figure 3:
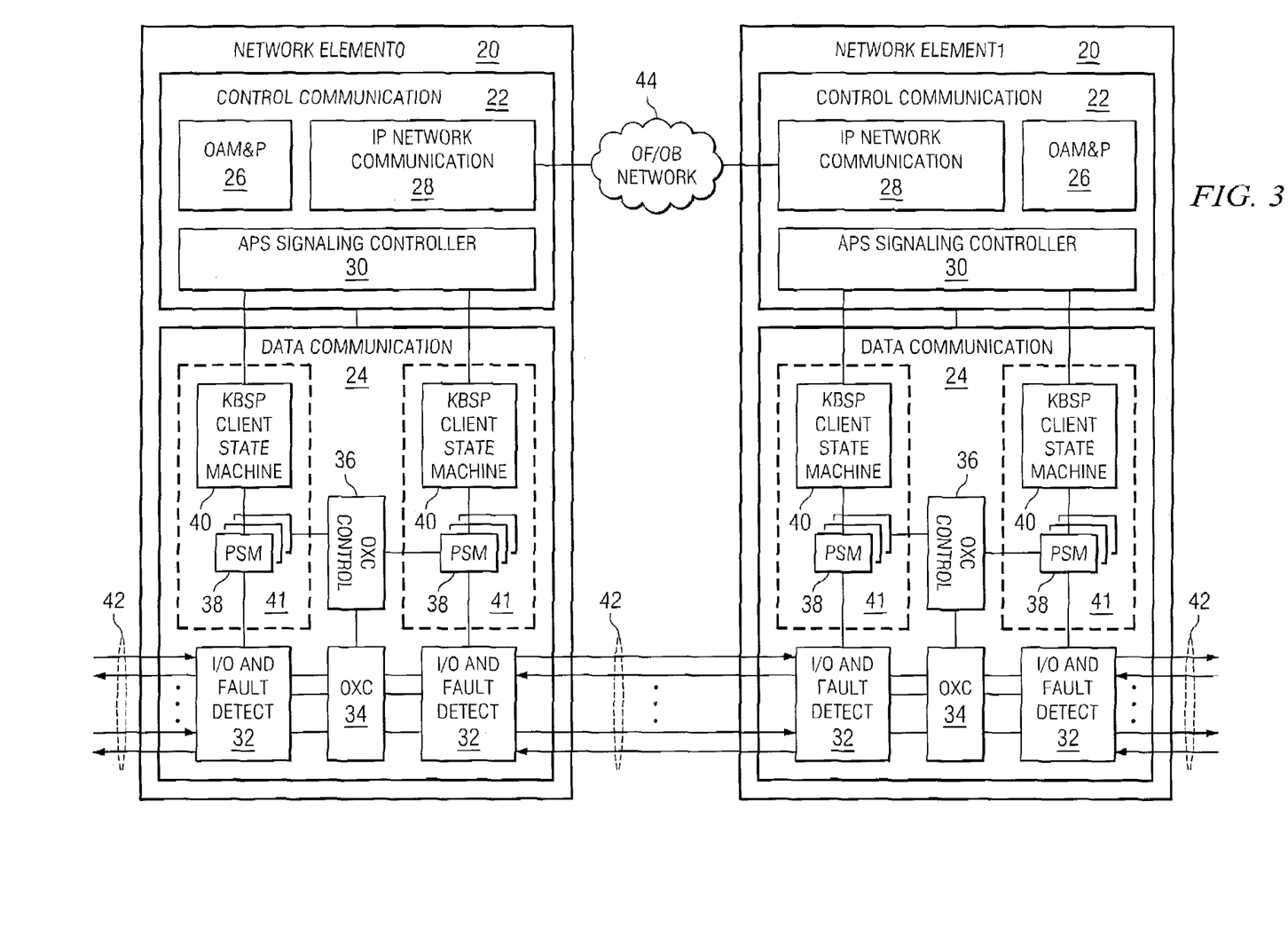
FIG. 3 illustrates a block diagram of a pair of network elements using out-of-fiber, out-of-band (OF/OB) networking to communicate control information compatible with existing K-Byte protocols.

FIG. 3 illustrates a block diagram of a pair of network elements 20 (individually labeled as Network Element0 and Network Element1) using out-of-fiber, out-of-band (OF/OB) networking to communicate control information compatible with existing K-Byte protocols.

Each network element 20 includes control communication circuitry 22 for communicating K1/K2-like control information between network elements and data communication circuitry 24 for transparently communicating data traffic. The control communications included OAM&P (Operations, Administration, Maintenance, and Provisioning) circuitry 26, IP Network Communication circuitry 28 and APS (Automatic Protection Switching) signaling controller 30. Data communication circuitry 24 includes I/O & Fault Detection circuits 32 coupled by an optical cross connect (OXC) 34. Optical cross connect 34 is controlled by OXC control circuitry 36. Protection state machines (PSM) 38 are coupled to respective I/O & Fault Detect circuits 32. KBSP (K-Byte Signaling Protocol) state machines 40 are coupled to respective protection state machines 38. The combined protection state machines 38 and associated client KBSP state machines 40 are referred to herein as the ring state machine (RSM) 41. The protection state machines 38 include state machines for each protection type (e.g., 1:1, 1:N, and so on) used by the network element. For each protection group, there is a separate signaling instance within the APS signaling controller 30, KBSP signaling controllers 40 and protection state machines 38.

In general operation, data traffic is passed between Network Element0 and Network Element1 on optical links 42. Data is passed transparently (i.e., without conversion to electronic signals) through the I/O & Fault Detect circuits 32 and optical cross connect 34 for communication to other network elements 20. The I/O and Fault Detect circuits 32 can detect a signal transmission fault on an incoming channel. A fault may occur on a single channel due to a laser malfunction or may occur simultaneously on multiple channels if a fiber is cut or inadvertently disconnected from a network element. At this point, a fault is sent to the associated protection state machine 38.

In a traditional SONET/SDH application the protection state machine would send messages in-band using K1/K2 signaling. In a transparent network, insertion of the K1/K2 bytes is not possible. In the network elements of FIG. 3, this data is sent to the associated KBSP Client state machine 40, which passes the information to the APS Signaling controller 30. The APS Signaling controller 30 uses the IP Network Communication circuit to pass the control information from KBSP Client state machine to neighboring network elements 20 over an out-of--fiber, out-of-band (OF/OB) network 44. The could be, for example, an IP-based network. The IP Network communication circuitry 28 performs common functions such as link management protocol (LMP) for establishing control sessions between nodes and associating control channels with data channels in a protect group. Further, the IP Network communication circuitry 28 includes a routing manager to efficiently route the control information.

Figure 4:
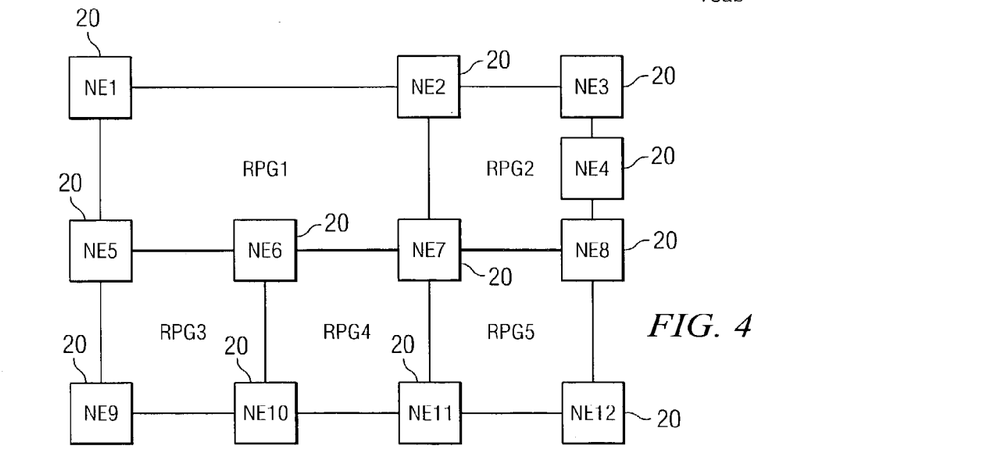
FIG. 4 illustrates a ring architecture capable of line shared protection ring (LSPR) protection.

In one embodiment of the invention, the protection state machines 38 include protection protocols that support shared protection lines. The LSPR (line shared protection ring) state machine. In a LSPR protection scheme, a single optical fiber is available for protection in two or more rings. FIG. 4 illustrates a ring architecture capable of LSPR protection. In this figure, twelve network elements are arranged in five ring protection groups (RPGs). Certain additional information is necessary support LSPR. A "ring sequence" is an ordered list of nodes that defines sequence of nodes upon which RPGs are built. In FIG. 4, RPG1's representation would be the ordered list NE1-NE2-NE7-NE6-NE5. A "local node" is the integer node number representing the local network element's node identifier for the associated ring protect group. A "node address list" is either an indexed list of IP addresses for each node in the ring protect group, or the IP address of the immediate east and west nodes from the local node perspective. Node addresses are required to allow for control plane communications flows. The IP control plane based APS signaling only requires east-west node addressing. The determination of maintaining east-west addressing or complete ring addressing may be determined based on the detailed definition of the protocol needed for ring connection map distribution.

A "Fast Facility Protection" (FFP) is a managed object association of facilities and protection information defining an instance of a protection switching construct. The association may define one of multiple protection constructs such as 1+1 line protection, m:n line protection, or various ring protection methods such as 4 fiber bi-directional line switched rings or line shared protection rings. For the addition of line shared protection rings, the following data from the association is of particular interest:

SCHEME—defines the type of protection association such as 1+1 or LSPR;

RPG ID—the ring protect group identifier that the FFP is associated with. Only applicable for ring schemes;

RING ID—specifies the individual ring instance identifier within the network level RPG that the FFP is associated to. Only applicable for ring schemes;

WORKING—ordered list for the east and west working facilities for the associated FFP. An individual working facility can only be associated to one FFP. Applicable for all protection schemes;

PROTECT—ordered list for the east and west protect facilities for the associated FFP. Specifying an individual protection facility to more than one FFP defines that protect facility as being a shared protection resource. Applicable for all protection schemes; and FFP EQPT ID—specifies the equipment identifier for processor board to which the FFP processing is assigned.

This information may be maintained by the OAM&P circuitry 26. RPG data is required by the Ring State Machine 41 for state machine processing and by the APS Signaling Controller component for APS signaling message routing.

The operation of network element 10 will now be discussed in greater detail. The APS signaling controller 30 is the interface component between the ring state machine 41 and the IP Network communication circuitry 28. Each APS signaling controller 30 and protection state machines 38 communicate via the KBSP client side state machine 40. APS signaling controller 30 of different network elements communicate by a KBSP server side state machine implemented in the APS signaling controllers. The operation for the client side and server side state machines are described in detail below.

The ring state machine 41 is the central component required for LSPR processing as it contains the core LSPR state machine algorithm. The ring state machine 41 is composed of two parts: (1) the protection state machine 38 that contains the protection decisions and (2) the KBSP client side state machine 40.

The protection state machine 38 of the ring state machine for LSPR performs the following functions:

Processing of inbound facility failures events;

Processing of inbound K-Byte status events

Finite state machine processing based on inbound events and current state;

Requesting the OXC control 36 perform appropriate bridging and switching functions based on state transitions; and Determining and requesting outbound K-Byte transmissions.

One instance of a ring state machine 41 will exist per fast facility protection.

The K-Byte Signaling Protocol described herein defines the out of band signaling protocol and associated state machines used to transmit K1/K2 like data between neighboring APS signaling controllers 30, and between APS signaling controllers 30 and associated ring state machines 41. In addition to traditional K1/K2 data, in the preferred embodiment, KBSP contains the necessary additional data required for the system to perform LSPR functionality. KBSP is designed to be flexible enough to support additional functionality as it is developed. KBSP protocol messages are encapsulated in IP packets for transmission across the control plane.

KBSP utilizes a lightweight hello protocol for peer discovery/synchronization and to limit the bandwidth required between peers.

Figure 5:
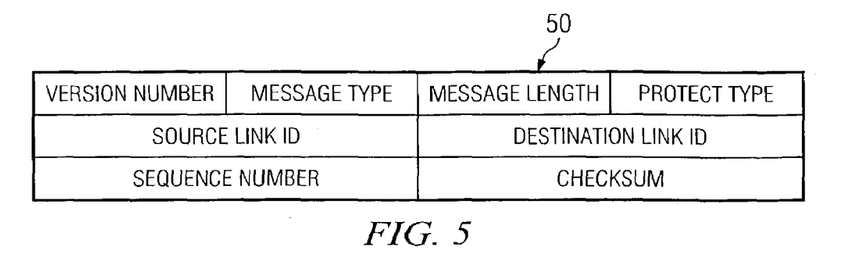
FIG. 5 illustrates a message header used on KBSP (K-Byte Signaling Protocol) messages.

FIG. 5 illustrates a header used on KBSP messages. The header has eight fields: version number, message type, message length, protect type, source link ID, destination link ID, sequence number and checksum. The version number indicates the version of KBSP being used for the message. The message type signifies what type of message is being transmitted. Currently defined message types (expressed in hexadecimal) are shown in Table 1.

TABLE 1

MESSAGE TYPES

| Value | Message type | Description |
|---|---|---|
| 0x01 | HELLO | "I'm alive" message sent from an APS Signaling Controller |
| 0x02 | CLIENT HELLO | "I'm alive" message sent from a client KBSP state machine |
| 0x03 | HELLO ACK | A successful "I'm alive" acknowledgement from an APS Signalling Controller |
| 0x04 | CLIENT HELLO ACK | A successful "I'm alive" acknowledgement from a client KBSP state machine |
| 0x05 | HELLO NAK | A non-successful "I'm alive" non-acknowledgement from an APS Signalling Controller |
| 0x06 | CLIENT HELLO NAK | A non-successful "I'm alive" non-acknowledgement from a client KBSP state machine |
| 0x07 | APS CHANGE | A notification of a change in Automatic Protection Switching K-byte data from an APS Signalling Controller |
| 0x08 | CLIENT APS CHANGE | A notification of a change in Automatic Protection Switching K-byte data from from a client KBSP state machine |
| 0x09 | APS CHANGE ACK | An acknowledgement of a change in Automatic Protection Switching K-byte data from an APS Signalling Controller |
| 0x0A | CLIENT APS CHANGE ACK | An acknowledgement of a change in Automatic Protection Switching K-byte data from a client KBSP state machine |
| 0x0B | APS CHANGE NAK | A non-acknowledgement of a change in Automatic Protection Switching K-byte data from an APS Signalling Controller |
| 0x0C | CLIENT APS CHANGE NAK | A non-acknowledgement of a change in Automatic Protection Switching K-byte data from a client KBSP state machine |

The message length field specifies the length (in bytes) of the KBSP message, including the KBSP header. The protect type field specifies the protection type being used. Currently defined protection types are shown in Table 2.

TABLE 2

PROTECTION TYPES

| Value | Protection Type | |
|---|---|---|
| 0x01 | 1_P_1_UNI | - 1 + 1 Uni-directional Line Protection |
| 0x02 | 1_P_1_BI | - 1 + 1 Bi-directional Line Protection |
| 0x03 | M_F_N | - M:N Bi-directional Line Protection |
| 0x04 | LSPR | - Line Shared Protection Ring Protection |
| 0x05 | 4FIBER_BI | - 4 Fiber Bi-directional Ring Protection |

The source link ID is an unnumbered link identifier for the source node sending the KBSP message that is used to validate connectivity at run time. The destination link ID is an unnumbered link identifier for the destination node receiving the KBSP message that is used to route the message to the appropriate KBSP instance and RSM instance. The sequence number field contains an incremental KBSP message sequence number. The checksum field contains the standard IP checksum of the entire contents of the KBSP message including the header.

Figure 6:
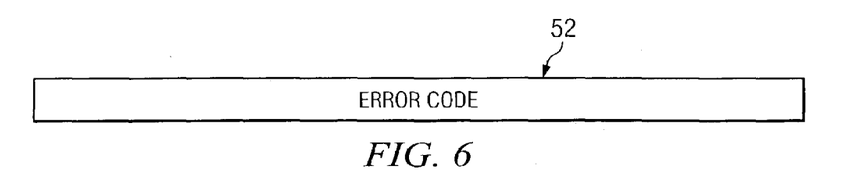
FIG. 6 illustrates a message body format for a NAK message.

The format of the message body depends upon the message type and protection type fields. The NAK message body format 52 used for all NAK message types is shown in FIG. 6. The NAK message body has a single field with a value indicating the reason for the NAK. The NAK field definitions are shown in Table 3.

TABLE 3

NAK ERROR CODES

| Value | Error |
|---|---|
| 0x01 | NOT READY |
| 0x02 | INVALID STATE |
| 0x03 | VERSION MISMATCH |
| 0x04 | PROTECT-TYPE-MISMATCH |
| 0x05 | CONNECTIVITY MISMATCH |
| 0x06 | RPG ID MISMATCH |
| 0x07 | RING-ID-MISMATCH |

Figure 7:
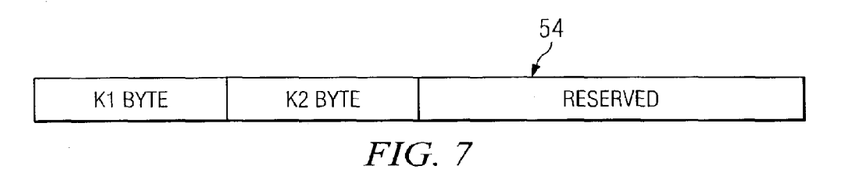
FIG. 7 illustrates a message body format for a non-NAK, non-LSPR message.

All non-NAK messages that do not have a LSPR protection type have a message format 54 shown in FIG. 7. Message format 54 has three fields: K1 Byte, K2 Byte and Reserved. The K1 Byte field stores the K1 byte according to the SONET/SDH K1 byte definition. The K2 Byte field stores the K2 byte according to the SONET/SDH K2 byte definition. The reserved field is for future expansion.

Figure 8:
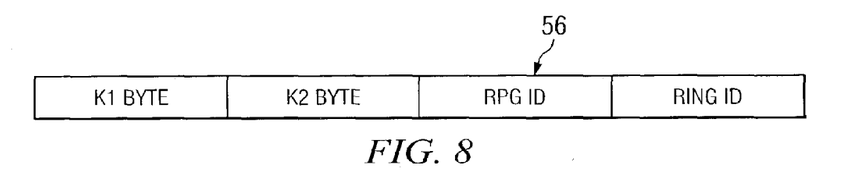
FIG. 8 illustrates a message body format for a non-NAK, LSPR message.

Non-NAK messages that have a LSPR protection type use a message format 56 shown in FIG. 8. Message format 56 has four fields: K1 Byte, K2 Byte, RPG ID and Ring ID. The K1 Byte field stores the K1 byte according to the SONET/SDH K1 byte definition. The K2 Byte field stores the K2 byte according to the SONET/SDH K2 byte definition. The RPG ID field stores an identifier for the network level ring protect group for configuration validation. The Ring ID field stores an identifier with the RPG for configuration validation and for ring number identification on shared protection lines.

The control information is passed between the KBSP client state machine 40 and the APS Signaling controller 30 in the formats shown in FIGS. 5-8. The client state machine 40 sends the information to the protection state machines 38 in the proper format, such that previously developed protection state machines can be used with little or no modification.

Figure 9:
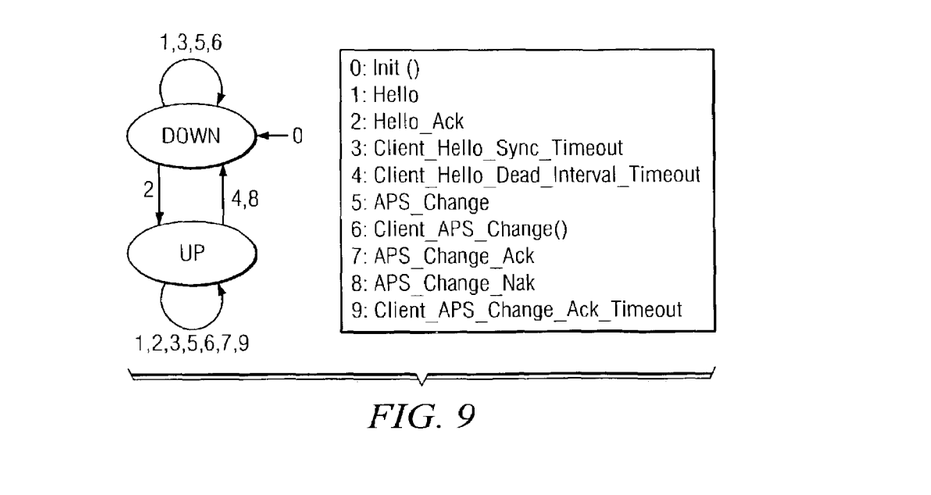
FIG. 9 illustrates a transition diagram for the KBSP client state machine of FIG. 3.

FIG. 9 illustrates a transition diagram for the KBSP client state machine 40. The KBSP client state machine 40 has two states: a down state 60 and an up state 62. The KBSP client state machine 40 enters the down state 60 responsive to an Init() message. When in the down state 60, the machine 40 remains in the down state 60 in response to any one of the following messages or events: Hello, Client_Hello_Sync_Timeout, APS_Change, Client_APS_Change(). The KBSP client state machine 40 changes to the up state 62 in response to a Hello_Ack message. Other messages or events are invalid from the down state. From the up state 62, the KBSP client state machine 40 remains in an up state responsive to the following messages or events: Hello, Hello_Ack, Client Hello_Sync_Timeout, APS_Change, Client_APS_Change (), APS_Change_Ack, Client_APS$_{13}$ Change_Ack_Timeout. The KBSP client state machine 40 transitions from the up state 62 to the down state 60 responsive to a Client_Hello_Dead_Interval_Timeout or APS_Change_Nak message. Other messages or events are invalid from the up state.

Table 4 describes the actions taken by the KBSP client state machine 40 in response to incoming messages and events.

TABLE 4

KBSP CLIENT STATE MACHINE ACTIONS

| Current State | Incoming Message | Actions |
|---|---|---|
| N/A | Initialization (0) | Set State to Down<br>Transmit Client_Hello message with current transmit K-Bytes<br>Set Client_Hello_Sync_Timer |
| Down | Hello Received (1) | Remain in Down state<br>Transmit Client_Hello_Nak message with NOT_READY error code<br>Transmit Client_Hello message with current transmit K-Bytes<br>Reset Client_Hello_Sync_Timer |
| Down | Hello Ack Received (2) | Transition to Up state.<br>Reset Client_Hello_Sync_Timer<br>Set Client_Hello_Dead_Interval_Timer |

TABLE 4-continued

KBSP CLIENT STATE MACHINE ACTIONS

| Current State | Incoming Message | Actions |
|---|---|---|
| Down | Client Hello Sync Timeout Received (3) | Remain in Down state<br>Transmit Client_Hello message with current transmit K-Bytes<br>Reset Client_Hello_Sync_Timer |
| Down | APS Change Received (5) | Remain in Down state.<br>Transmit Client_APS_Change_Nak message with NOT_READY error code<br>Transmit Client_Hello message with current transmit K-Bytes<br>Reset Client_Hello_Sync_Timer |
| Down | Client APS Change ( ) Event (6) | Remain in Down state.<br>Transmit Client_Hello message with current transmit K-Bytes<br>Reset Client_Hello_Sync_Timer |
| Up | Hello Received (1) | Remain in Up state.<br>Forward received K-Bytes to Protection State Machine<br>Transmit Client_Hello_Ack message with current transmit K-Bytes<br>Reset Client_Hello_Sync_Timer<br>Reset Client_Hello_Dead_Interval_Timer |
| Up | Hello Ack Received (2) | Remain in Up state<br>Forward received K-Bytes to Protection State Machine<br>Reset Client_Hello_Sync_Timer<br>Reset Client_Hello_Dead_Interval_Timer |
| Up | Client Hello Sync Timeout Received (3) | Remain in Up state<br>Transmit Client_Hello message with current transmit K-Bytes<br>Reset Client_Hello_Sync_Timer |
| Up | Client Hello Dead Interval Timeout Received (4) | Set State to Down<br>Transmit Client_Hello message with current transmit K-Bytes<br>Reset Client_Hello_Sync_Timer if existing<br>Clear Client_Change_Ack_Timer if existing and set Client_Hello_Sync_Timer |
| Up | APS Change Received (5) | Remain in Up state.<br>Transmit Client_APS_Change_Ack message with current transmit K-Bytes<br>Forward received K-Bytes to Protection State Machine<br>Reset Client_Hello_Sync_Timer<br>Reset Client_Hello_Dead_Interval_Timer |
| Up | Client APS Change ( ) Event (6) | Remain in Up state.<br>Transmit Client_APS_Change message with current transmit K-Bytes<br>Clear Client_Hello_Sync_Timer<br>Set Client_APS_Change_Ack_Timer |
| Up | APS Change Ack Received (7) | Remain in Up state.<br>Clear Client_Change_Ack Timer<br>Set Client_Hello_Sync_Timer<br>Reset Client_Hello_Dead_Interval_Timer |
| Up | APS Change Nak Received (8) | Set State to Down<br>Transmit Client_Hello message with current transmit K-Bytes<br>Clear Client_Change_Ack_Timer<br>Clear Client_Hello_Dead_Interval_Timer<br>Set Client_Hello_Sync_Timer<br>Process Nak Error Code |
| Up | Client APS Change Ack Timeout Received (9) | Remain in Up state.<br>Transmit Client APS Change message with current transmit K-Bytes<br>Set Client_APS_Change_Ack_Timer |

Figure 10:
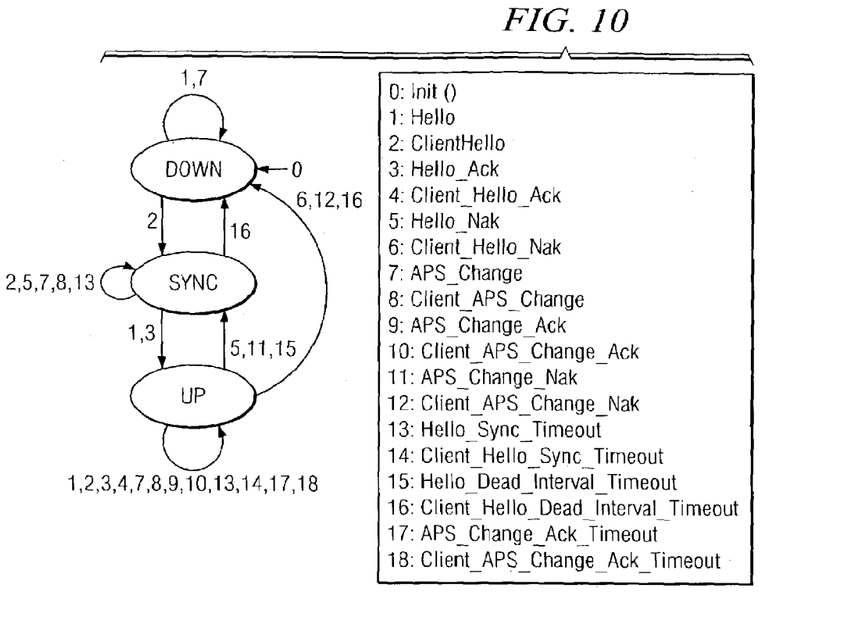
FIG. 10 illustrates a transition diagram for the KBSP server state machine of the APS Signaling controller of FIG. 3.

FIG. 10 illustrates a transition diagram for the server state machine of the APS Signaling controller 30. The APS Signaling controller 30 has three states: a down state 70, a sync state 72 and an up state 74. The APS Signaling controller 30 enters the down state 70 responsive to a Init() message. When in the down state 70, the APS signaling controller 30 remains in the down state 70 in response to either a Hello message or an $APS_{13}$ Change. The APS signaling controller 30 changes from the down state 70 to the sync state 72 in response to a Client_Hello message. Other messages or events are invalid from the down state.

From the sync state 72, the APS Signaling controller remains in the sync state 72 in response to Client_Hello, Hello_Nak, APS_Change, Client_APS_Change, or Hello_

Sync_Timeout. The APS Signaling controller 30 returns to the down state from the sync state 72 in response to a Client_Hello_Dead_Interval_Timeout. The APS Signaling controller 30 transitions from the sync state 72 to the up state 74 responsive to a Hello message or a Hello_Ack message.

From the up state 74, the APS Signaling controller remains in the up state 74 responsive to a Hello, Client-Hello, Hello_Ack, Client_Hello_Ack, APS_Change, Client_APS_Change, APS_Change_Ack, Client APS_Change_Ack, Hello_Sync_Timeout, Client_Hello_Sync_Timeout, APS_Change_Ack_Timeout, or Client_APS_Change_Ack_Timeout. The APS Signaling controller transitions from the up state 74 to the sync state 72 in response to a Hello_Nak, an APS_Change_Nak, or a Hello_Dead_Interval_Timer. The APS Signaling controller transitions from the up state 74 to the down state 70 responsive to a Client_Hello_Nak, Client_APS_Change_Nak, or a Client_Hello_Dead_Interval_Timeout.

Table 5 describes the actions taken by the APS Signaling controller 30 in response to incoming messages and events. This table shows the high level flow of the protocol and is not exhaustive of all error conditional flows. The general flow between the KBPS client state machine 40 and the APS Signaling controller 30 is to synchronize clients and servers, and then synchronize peer servers in an independent manner.

TABLE 5

APS SIGNALING CONTROLLER ACTIONS

| Current State | Incoming Message | Actions |
| --- | --- | --- |
| N/A | Initialization (0) | Set state to Down<br>Set current receive K-Bytes to NULL<br>Set current transmit K-Bytes to NULL |
| Down | Hello Received (1) | Remain in Down state<br>Transmit Hello_Nak message to peer with NOT_READY error code |
| Down | Client Hello Received (2) | Set state to Sync<br>Store current transmit K-Bytes<br>Transmit Hello_Ack message to client with current receive K-Bytes<br>Transmit Hello message to peer with current transmit K-Bytes<br>Set Client_Hello_Dead_Interval_Timer<br>Set Hello_Sync_Timer |
| Down | APS Change Received (7) | Remain in Down state<br>Transmit APS_Change_Nak message to peer with NOT_READY error code |
| Sync | Hello Received (1) | Set state to Up<br>Store current receive K-Bytes<br>Transmit Hello_Ack message to peer with current transmit K-Bytes<br>Transmit Hello message to client with current receive K-Bytes<br>Set Client_Hello_Sync_Timer<br>Reset Hello_Sync_Timer<br>Set Hello_Dead_Interval_Timer |
| Sync | Client Hello Received (2) | Remain in Sync state<br>Store current transmit K-Bytes<br>Transmit Hello_Ack message to client with current receive K-Bytes<br>Reset Client_Hello_Dead_Interval_Timer |
| Sync | Hello Ack Received (3) | Set state to Up<br>Store current receive K-Bytes<br>Transmit Hello message to client with current receive K-Bytes<br>Set Client_Hello_Sync_Timer<br>Reset Hello_Sync_Timer<br>Set Hello_Dead_Interval_Timer |
| Sync | Hello Nak Received (5) | Remain in Sync state<br>Set current receive K-Bytes to NULL<br>Reset Hello_Sync_Timer |
| Sync | APS Change Received (7) | Remain in Sync state<br>Set current receive K-Bytes to NULL<br>Transmit APS_Change_Nak message to peer with NOT_READY error code |
| Sync | Client APS Change Received (8) | Remain in Sync state<br>Store current transmit K-Bytes<br>Transmit APS_Change_Ack message to client with current receive K-Bytes<br>Reset Client_Hello_Dead_Interval_Timer |
| Sync | Hello Sync Timeout Received (13) | Remain in Sync state<br>Transmit Hello message to peer with current transmit K-Bytes<br>Set Hello_Sync_Timer |
| Sync | Client Hello Dead Interval Timeout Received (16) | Set state to Down<br>Set current receive K-Bytes to NULL<br>Set current transmit K-Bytes to NULL |

TABLE 5-continued

APS SIGNALING CONTROLLER ACTIONS

| Current State | Incoming Message | Actions |
|---|---|---|
| Up | Hello Received (1) | Clear Client_Hello_Sync_Timer<br>Clear Hello_Sync_Timer<br>Clear Hello_Dead_Interval_Timer<br>Remain in Up state<br>Store current receive K-Bytes<br>Transmit Hello_Ack message to peer with current transmit K-Bytes<br>Reset Hello_Sync_Timer<br>Reset Hello_Dead_Interval_Timer |
| Up | Client Hello Received (2) | Remain in Up state<br>Store current transmit K-Bytes<br>Transmit Hello_Ack message to client with current receive K-Bytes<br>Reset Client_Hello_Dead_Interval_Timer |
| Up | Hello Ack Received (3) | Remain in Up state<br>Store current receive K-Bytes<br>Reset Hello_Sync_Timer<br>Reset Hello_Dead_Interval_Timer |
| Up | Client Hello Ack Received (4) | Remain in Up state<br>Store current transmit K-Bytes<br>Clear Client_Hello_Sync_Timer<br>Reset Client_Hello_Dead_Interval_Timer |
| Up | Hello Nak Received (5) | Set state to Sync<br>Set current receive K-Bytes to NULL<br>Reset Hello_Sync_Timer<br>Clear Hello_Dead_Interval_Timer |
| Up | Client Hello Nak Received (6) | Set state to Down<br>Set current receive K-Bytes to NULL<br>Set current transmit K-Bytes to NULL<br>Clear Client_Hello_Sync_Timer<br>Clear Client_Hello_Dead_Interval_Timer<br>Clear Hello_Sync_Timer<br>Clear APS_Change_Nak_Timer<br>Clear Hello_Dead_Interval_Timer |
| Up | APS Change Received (7) | Remain in Up state<br>Store current receive K-Bytes<br>Transmit APS_Change_Ack message to peer with current transmit K-Bytes<br>Transmit APS_Change message to client with current receive K-Bytes<br>Set Client_APS_Change_Ack_Timer<br>Reset Hello_Sync_Timer<br>Reset Hello_Dead_Interval_Timer |
| Up | Client APS Change Received (8) | Remain in Up state<br>Store current transmit K-Bytes<br>Transmit APS Change message to peer with current transmit K-Bytes<br>Transmit APS Change Ack message to client with current receive K-Bytes<br>Clear Hello_Sync_Timer<br>Set APS_Change_Ack_Timer<br>Reset Client Hello_Dead_Interval_Timer |
| Up | APS Change Ack Received (9) | Remain in Up state<br>Store current receive K-Bytes<br>Clear APS Change_Ack Timer<br>Set Hello_Sync_Timer<br>Reset Hello_Dead_Interval_Timer |
| Up | Client APS Change Ack Received (10) | Remain in Up state<br>Store current transmit K-Bytes<br>Clear Client_APS_Change_Ack_Timer<br>Reset Client_Hello_Dead_Interval_Timer |
| Up | APS Change Nak Received (11) | Set state to Sync<br>Set current receive K-Bytes to NULL<br>Clear APS Change_Ack Timer<br>Transmit Hello message to peer with current transmit K-Bytes<br>Set Hello_Sync_Timer<br>Clear Hello_Dead_Interval_Timer |
| Up | Client APS Change Nak Received (12) | Set state to Down<br>Set current receive K-Bytes to NULL<br>Set current transmit K-Bytes to NULL<br>Clear Client_APS_Change_Nak_Timer<br>Clear Client_Hello_Dead_Interval_Timer<br>Clear Hello_Sync_Timer |

TABLE 5-continued

APS SIGNALING CONTROLLER ACTIONS

| Current State | Incoming Message | Actions |
|---|---|---|
| Up | Hello Sync Timeout Received (13) | Clear APS_Change_Nak_Timer<br>Clear Hello_Dead_Interval_Timer<br>Remain in Up state<br>Transmit Hello message to peer with current transmit K-Bytes<br>Set Hello_Sync_Timer |
| Up | Client Hello Sync Timeout Received (14) | Remain in Up state<br>Transmit Hello message to client with current receive K-Bytes<br>Set Client_Hello_Sync_Timer |
| Up | Hello Dead Interval Timeout Received (15) | Set state to Sync<br>Set current receive K-Bytes to NULL<br>Transmit Hello message to peer with current transmit K-Bytes<br>Clear APS_Change_Ack_Timer<br>Clear Hello_Sync_Timer<br>Set Hello_Sync_Timer |
| Up | Client Hello Dead Interval Timeout Received (16) | Set state to Down<br>Set current receive K-Bytes to NULL<br>Set current transmit K-Bytes to NULL<br>Clear Client_APS_Change_Nak_Timer<br>Clear Client_Hello_Sync_Timer<br>Clear Hello_Sync_Timer<br>Clear APS_Change_Nak_Timer<br>Clear Hello_Dead_Interval_Timer |
| Up | APS Change Ack Timeout Received (17) | Remain in Up state<br>Transmit APS_Change message to peer with current transmit K-Bytes<br>Set APS_Change_Ack_Timer |
| Up | Client_APS_Change_Ack_Timeout | Remain in Up state<br>Transmit APS_Change message to client with current receive K-Bytes<br>Set Client_APS_Change Ack Timer |

Figure 11:
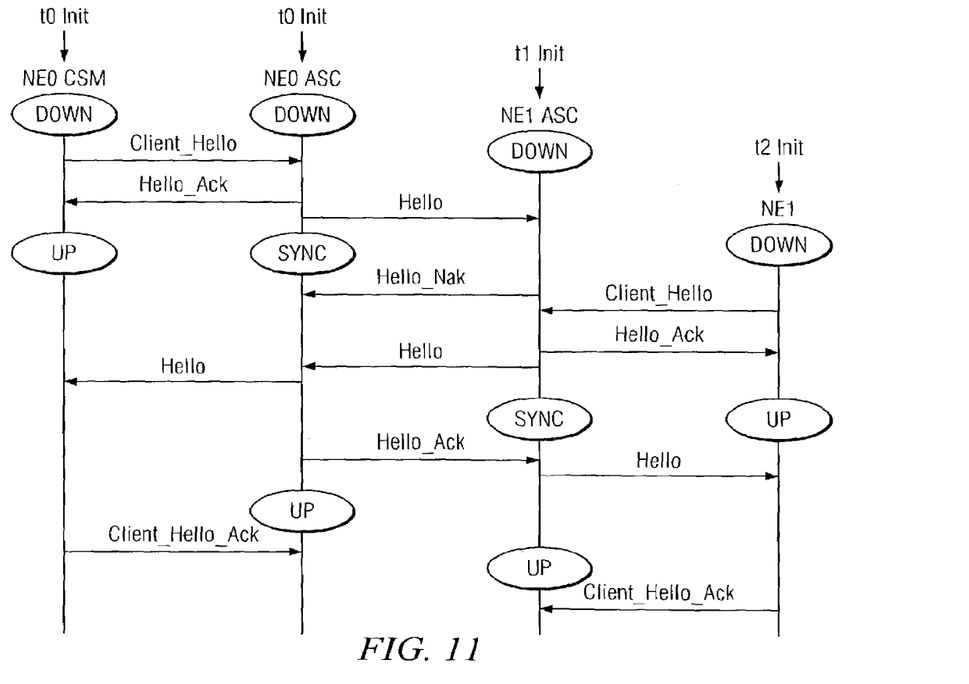
FIG. 11 illustrates a synchronization message flow.
Figure 12:
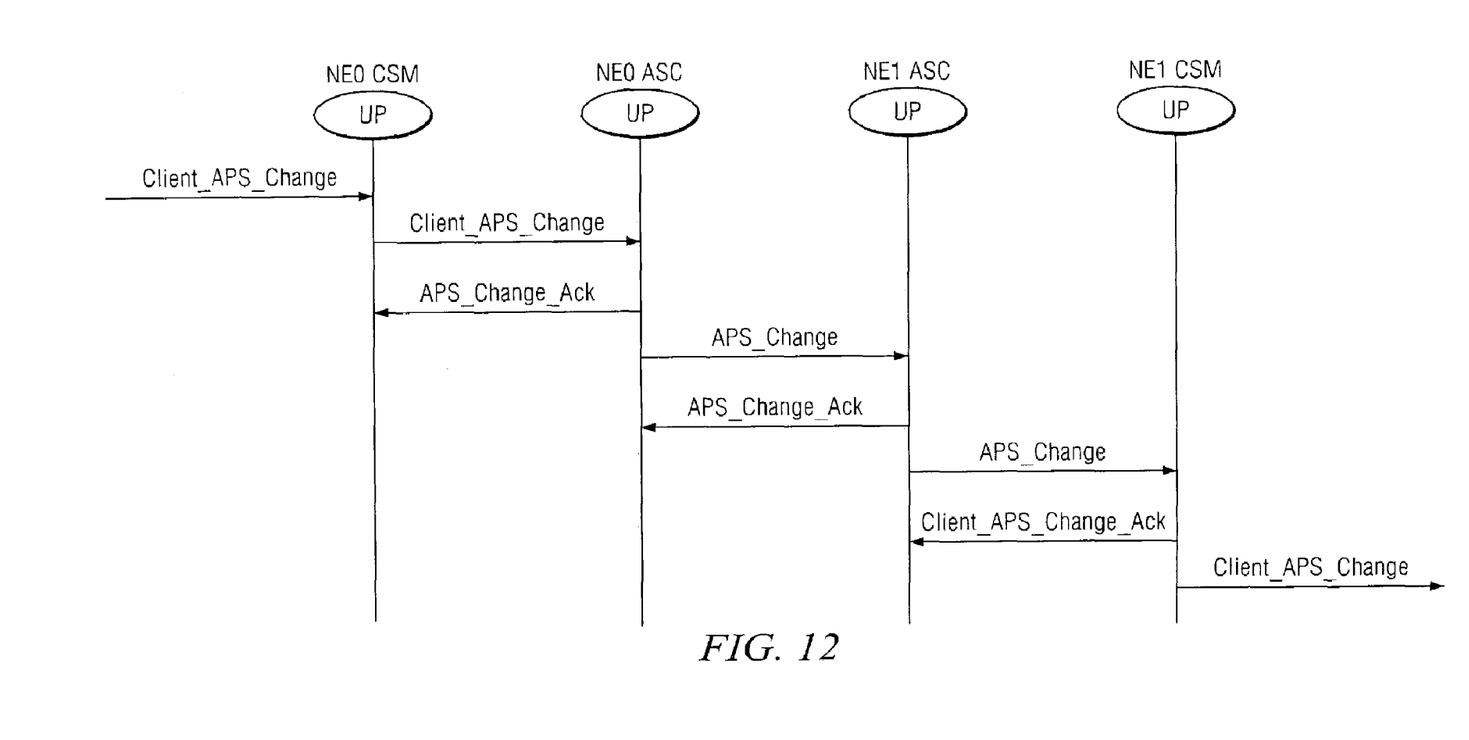
FIG. 12 illustrates an APS_Change message flow.

For illustration of the KBPS, FIGS. 11 and 12 illustrate message flow scenarios. FIG. 11 illustrates a synchronization message flow. At time t0, the NE0 KBPS client state machine 40 receives and initialization message as does the NE0 APS signaling controller 30. In response to receiving the Initialization message, the NE0 KBPS client state machine 40 sends a Client_Hello to the NE0 APS signaling controller 30 (which transitions to the up state). The APS signaling controller 30 responds by sending a Hello_Ack to the NE0 KBPS client state machine 40 and a Hello message to the NE1 APS signaling controller 30. Further, the NE0 APS signaling controller changes to the sync state. The NE1 APS signaling controller 30 receives an initialization message at time t1, but is still in a down state when it receives the Hello from the NE0 APS signaling controller, so it sends a Hello_Nak to the NE0 APS signaling controller 30.

At time t2, the NE1 client state machine 40 receives an initialization message, and responds be sending a Client_Hello message to the NE1 APS signaling controller 30. The NE1 APS signaling controller 30 responds with a Hello_Ack to the NE1 client state machine 40 (which transitions to the up state) and a Hello to the NE0 APS signaling controller 30 as it enters the sync state. Upon receiving the Hello, the NE0 sends a Hello to the NE0 client state machine 40 (which responds with a Client_Hello_Ack) and sends a Hello_Ack to the NE1 APS signaling controller 30. The NE0 APS signaling controller 30 also enters the up state.

Upon receiving the Hello_Ack, the NE1 APS signaling controller 30 enters the up state and sends a Hello the NE1 client state machine 40. The NE1 client state machine 40 sends a Client_Hello_Ack.

FIG. 12 illustrates an APS_Change message flow. The NE0 client state machine 40, NE0 APS signaling controller 30, NE1 client state machine 40, NE1 APS signaling controller 30 are all in an up state. A Client_APS_Change is received by the NE0 client state machine 40 from the protection state machine 38. The NE0 client state machine 40 transmits the Client_APS_Change message with the current K-Bytes to the NE0 APS signaling controller 30. In response to receiving the Client_APS_Change message from the NE0 client state machine 40, the NE0 APS signaling controller 30 transmits the APS_Change_Ack message to the client state machine 40 and an APS_Change message to the NE1 APS signaling controller 30 with the current transmit K-Bytes. The NE1 APS signaling controller 30 stores the current receive K-bytes and responds to the NE0 APS signaling controller 30 with a APS_Change_Ack. The NE1 APS signaling controller 30 sends the APS_Change message to the NE1 client state machine 40. The NE1 client state machine 40 responds with a Client_APS_Change_Ack to the NE1 APS signaling controller 30 with current transmit K-bytes and forwards the received K-bytes to the appropriate protection state machine 38.

The present invention provides significant advantages over the prior art. First, a transparent network element can be designed using previously developed and field-tested protection state machines. The client state machine and the APS signaling controller pass control information through an out-of-fiber, out-of-band network such that the protection state machines received K-Bytes in a standard format. Second, a new protection state machines, such as a shared protection ring state machine, can easily be added without affecting operation of other protection state machines.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A network element comprising:
   input/output circuitry for transmitting and receiving data traffic over optical links;
   protection state machines for receiving control information from input/output circuitry indicating transmission failures, wherein the protection state machines include:
     a first protection state machine for processing traditional SONET information; and
     a second protection state machine for processing control information concerning line shared protection rings;
   circuitry for receiving error messages from said protection state machines and passing error information to adjacent network elements over an out-of-band network.

2. The network element of claim 1 wherein said circuitry for receiving error messages comprises:
   a server side interface of interfacing with said out-of-band network; and
   a client side interface for interfacing with said protection state machines.

3. The network element of claim 2 wherein said client side interface comprises:
   circuitry for communicating with said server side interface with a first message format; and
   circuitry for communicating with one or said protection state machines using a second message format depending upon a protection type.

4. The network element of claim 3 wherein said first message format includes a message header and a message body.

5. The network element of claim 4 wherein said message header includes an indication of the protection type associated with the message.

6. The network element of claim 5 wherein said message header further includes an indication of the message type associated with the message.

7. The network element of claim 6 wherein said message header further includes an indication of a source link and a destination link.

8. The network element of claim 6 wherein said message body includes an error code if the message type is a Nak.

9. The network element of claim 6 wherein said message body includes a K1 byte and a K2 byte according to SONET/SDH definition if the protection type is not a shared protection ring protection type and the message type is not a Nak.

10. The network element of claim 6 wherein said message body includes a K1 byte, a K2 byte, an indication of a ring protection group, and an indication of a ring within the ring protection group if the protection type is a shared protection type and the message type is not a Nak.

11. A method of communicating between network elements, comprising the steps of:
    transmitting and receiving data traffic over optical channels;
    generating error messages in protection state machines indicating transmission failures,
      wherein the error messages have different formats depending on a protection protocol type supported by a protection state machine;
    translating the error messages in the different formats to another second format; and
    passing the error messages in the second format to adjacent network elements over an out-of-band network.

12. The method of claim 11 wherein said generating step comprises the step of generating error messages in a traditional K1/K2 byte format.

13. The method of claim 11 wherein said generating step comprises generating error messages associated with shared protection ring spans.

14. The method of claim 11 wherein said translating step comprises the steps of:
    interfacing with said out-of-band network with a server side interface; and
    interfacing with said protection state machines with a client side interface.

15. The method of claim 14 and further comprising the steps of:
    communicating between the client side interface and said protection state machines using different formats depending upon a protection type; and
    communicating between the server side interface and out of band network with error messages in the second format.

16. The method of claim 15 wherein said second format includes a message header and a message body.

17. The method of claim 16 wherein said message header includes an indication of the protection type associated with the message.

18. The method of claim 17 wherein said message header further includes an indication of the message type associated with the message.

19. The method of claim 18 wherein said message header further includes an indication of a source link and a destination link.

20. The method of claim 18 wherein said message body includes an error code if the message type is a Nak.

21. The method of claim 18 wherein said message body includes a K1 byte and a K2 byte according to SONET/SDH definition if the protection type is not a shared protection ring protection type and the message type is not a Nak.

22. The method of claim 18 wherein said message body includes a K1 byte, a K2 byte, an indication of a ring protection group, and an indication of a ring within the ring protection group if the protection type is a shared protection type and the message type is not a Nak.

* * * * *